United States Patent Office 3,128,171
Patented Apr. 7, 1964

3,128,171
CONTROLLING WEED GROWTH IN A CORN CROP
Nathaniel Tischler, Jamesburg, N.J., assignor to Heyden Newport Chemical Corporation, a corporation of Delaware
No Drawing. Filed Nov. 19, 1956, Ser. No. 622,739
16 Claims. (Cl. 71—2.6)

The present invention relates to controlling selectively for a prolonged period weed growth in an area normally supporting a corn crop.

This application is a continuation-in-part of my copending application Serial No. 515,262, filed June 13, 1955, and of my copending application Serial No. 529,953, filed August 22, 1955, now abandoned, which is a continuation-in-part of my copending and still pending application Serial No. 463,829, filed October 21, 1954, now abandoned.

Generally speaking my process comprises applying to a corn crop area a herbicidal composition containing a herbicidal material selected from the group consisting of 2,3,6-trichlorobenzoic acid, salts of this acid and mixtures thereof to control selectively the weed growth in the area over a prolonged period. The herbicidal composition may be applied to the area at about the time of planting or when the area contains an established growing corn crop. When applied at about the time of planting, the composition is applied to the soil in the area. When the composition is applied to an area containing an established growing corn crop, the composition is normally applied to whatever established weed growth is present to inhibit this weed growth and also to the soil in the area to prevent new weed growth which would appear in the area, especially after the established weed growth and its inhibiting influence has been removed. The herbicide applied to the soil also tends to destroy the established weed growth, apparently by action through the root system.

Weed growth in the corn field adversely affects the yield and in order properly to control the weed growth by cultivation, the farmer must not only periodically cultivate the area but the cultivations must be carried out at the proper time and a postponement of only a few days may greatly reduce its effectiveness in controlling weed growth. Wet weather or other difficulties frequently prevent the farmer from cultivating the growing corn at the proper time and the prolific weeds quickly become well established. Such weed growth is extremely difficult to destroy by cultivation and this is particularly true of the weeds in the corn rows where the cultivator prongs or shoes do not reach and "hilling" of the soil is relied on to destroy weeds by covering them with the soil. Even though a cultivation does destroy most of the weeds present, new weeds quickly spring up. In accordance with the present process, the area can be treated at any time throughout the period extending from preparation of the soil for planting to the "lay by" period when the corn reaches such a height that heavy farming equipment cannot be used in the area without damaging the tall corn. Herbicidal treatment may follow cultivation to inhibit new weed growth, the cultivation not only destroying most or all of the established weeds but also loosening and aerating the soil. After the area has been treated with the present herbicide, the area can be cultivated if necessary to loosen the soil particularly when the area is sprayed prior to the "lay by" period. However, with the present herbicidal treatment, cultivation is not so pressing a problem and a farmer can postpone it and can use fewer cultivations or eliminate subsequent cultivations. When the herbicide is applied at about the time of planting or when the corn is relatively short, application of the herbicide to the soil is especially desirable as new or subsequent weed growth usually is more prolific at this time and the herbicide on the superficial soil effectively inhibits such new weed growth and this effect extends over a prolonged period. The farmer by using the present herbicide has greater flexibility in his work schedule and can reduce or eliminate the cultivations insofar as the weed problem is concerned. The use of the present herbicide in an area before or after emergence of the corn effectively inhibits weed growth in the area thereby resulting in a greater yield of corn.

I use the phrase "at about the time of planting the crop" to embrace a period beginning before and ending after planting and during which the compound may be applied to the soil and in which the farmer can conveniently schedule his work as described herein. In relation to the time when the soil is prepared for planting of the crop, and is thereby made substantially free of weeds, this period is defined as the period in which no material weed growth has started. With that basic requirement, the precise relation to the time of planting depends on a balance of considerations which vary somewhat in different cases.

Thus, when the planting of the crop occurs promptly after the soil is prepared, the treatment of the soil by my process may be deferred until several days after planting, and for as long as a week or more after planting in the case of early season planting when weed growth is not rapid. This procedure gives a maximum period of protection of the crop during its germination and growth by deferring the initiation of the crop protecting action to the latest time. On the other hand, if the scheduling of the farmer's work makes it desirable, the treatment of the soil may precede the planting. While this shortens the period of protection of the crop, the effect in that respect is tolerable because of the prolonged protection that is afforded; and the farmer is therefore permitted more flexibility in his work than when using compounds having a more limited period of active protection.

For the same reason, that is, that my process prolongs the period of protection against weed growth, it becomes possible for the farmer whose schedule of work makes it desirable to do so to allow a relatively long time to elapse between the preparation of the soil and the planting of the crop, and yet accomplish a substantial degree of protection of the crop thereafter. In such a case, the prepared soil is treated by my process before the onset of weed growth; and the planting of the crop may then be deferred for even a matter of weeks, while still leaving a substantial period of active effect in protection of the crop during its germination and growth. Weed growth which otherwise would occur prior to such a deferred planting time is prevented by my process, and yet a protective action remains after planting.

The optimum protection of the crop is obtained, however, when considering both length of protection and degree of inhibition of weed growth, the preparation of the soil, the planting and the treatment of the soil by my process all occur within a period of a few days. While this is the preferred manner in which my process is carried out, I do not limit myself to it in view of the advantages in flexibility of work schedules which are made possible as described above; and I include all of these various practices within the term defined as "above the time of planting the crop."

In summary, the period so defined and referred to as "at about the time of planting the crop" includes the period from soil preparation prior to planting down to a time a week or more after planting, but all subject to the general limit of being the period between the preparation of the soil for planting and the time when substantial weed growth is incipient.

The expression "established growing corn crop" refers to growing corn crops which have achieved substantial growth. Under normal climatic conditions field and sweet corn will achieve substantial growth in about a week to 12 days after planting. There is no limitation as to maximum growth of the corn crop which may have occurred prior to treatment as long as the necessary equipment can enter the area without undue damage to the corn.

While the growing or culture of a corn crop in an area has been divided into the two periods insofar as concerns treatment of the area and the matter of preferred dosages which will be subsequently discussed, it is to be understood that these two periods together cover the entire period for growing a corn crop in an area and my process gives effective protection of such crop, without appreciable damage to the crop at any stage of its growth to maturity. It is superior to "2-4-D" (2,4-dichlorophenoxy acetic acid), which is commonly taken as the standard of comparison, in giving a substantially longer period of protection against weed growth, even at lower dosages per acre, and in causing less damage to the crop when high dosages are used.

By "a corn crop" I mean *Zea mays* including all of its varieties such, for example, as field corn, sweet corn and pop corn, Holcus including various sorghums and Saccharum including various sugar canes, all of which are robust monocotyledonous plants.

The amount of herbicide applied to the area in my process depends on a number of factors including the amount of rainfall, the type of corn crop and the soil and rainfall conditions. In general, somewhat larger dosages are used with field corn than with sweet corn. Larger dosages are used with heavy soil high in organics than with light sandy soils. Somewhat larger dosages also may be used in locations receiving relatively light rainfall. In general, somewhat larger dosages may be used at about the time of planting than when the area contains an established growing corn crop.

Having regard to these factors, the amount of herbicide of the present invention applied to the soil at about the time of planting is in the range from about 0.15 lb. per acre to about 3.0 lbs. per acre. Such herbicides are normally included in suitable herbicidal compositions for convenient application to the soil; and the quantity of herbicidal composition applied in carrying out my process would, of course, be determined so as to apply the aforementioned amount of my herbicide whether or not any other materials, including other herbicidal compounds, may be in the herbicidal composition. In this connection, my herbicides may be used in association with other herbicidal compounds in order to obtain a prolongation of the protection beyond what the other compounds alone would give. When used alone, the amount of the compound of my process ranges from about 0.35 lb. per acre to about 3.00 lbs. per acre, and the optimum dosage under average soil and rainfall conditions is from about 0.5 lb. per acre to about 1.5 lbs. per acre.

My relatively heavy dosages, of the order of 2 to 2.25 lbs. per acre, are warranted, only under very unusual soil and water conditions. On the other hand, the very light dosages, of the order of 0.15 lb. per acre, would ordinarily be used in association with other herbicides and if used alone and while inhibiting weed growth, do not do so to the extent commonly desired and therefore would not ordinarily be used alone unless the soil and water conditions were very unusual.

The amount of herbicide of the present invention applied to the area when it contains an established growing corn crop normally is in the range of about 0.15 lb. per acre to about 2 lbs. per acre. Preferably, and particularly for *Zea mays* crops such as sweet corn and field corn, the amount of the compound of my process will usually range from about 0.25 lb. per acre to about 1.5 lbs. per acre, and the optimum dosage under average soil and rainfall conditions is from about 0.35 lb. per acre to about 1.25 lbs. per acre.

My relatively heavy dosages for when the area contains an established growing corn crop, of the order of 1.5 to 2 lbs. per acre, are warranted, only under very unusual soil and water conditions. On the other hand, the very light dosages, of the order of 0.25 lb., or less, per acre, would ordinarily be used in association with other herbicides and if used alone and while inhibiting weed growth, do not do so to the extent commonly desired and therefore would not ordinarily be used alone unless the soil and water conditions were very unusual.

The above dosages as well as those referred to in the examples hereinafter, if the acid is used, constitute the actual weight of the acid applied; but if a salt is used, the dosage refers to the amount of acid to which the actual quantity of salt applied is equivalent. In other words, the dosage amount of 2,3,6-trichlorobenzoic acid is reacted with the proper quantity of salt former to produce the quantity of salt to be applied.

In connection with my work with 2,3,6-trichlorobenzoic acid and its salts, I have found that a mixture of isomers containing about 70% 2,3,6-trichlorobenzoic acid with the remainder being other isomers of trichlorobenzoic acid, produces results apparently about equivalent to those of the pure 2,3,6-isomer. The other isomers present, of which the 2,4,5-isomer is the major one, do not individually have herbicidal activity at all comparable with that of the 2,3,6-isomer. Such a mixture of isomers produces a herbicidal effect greater than the sum of the effect of the individual isomers in the amount present in the mixture. Such a mixture produces a synergistic effect. When using a mixture of isomers to obtain such an effect I preferably use one containing about 60–75% of the 2,3,6-isomer, however, a mixture of isomers containing 50–90% of the 2,3,6-isomer may be used. The aforementioned dosages are based on the 2,3,6-trichlorobenzoic acid present without regard to the presence of other isomers. It is to be understood that throughout this application when referring to dosages of the present herbicide and unless stated differently it is the quantity of 2,3,6-trichlorobenzoic acid which is referred to regardless of whether or not other herbicides or other isomers are present, either in the foregoing proportions or in any other proportions.

The previous remarks concerning the salts of 2,3,6-trichlorobenzoic acid are also applicable to the salts of the mixtures of isomers trichlorobenzoic acid containing the 2,3,6-isomer. Where a salt of 2,3,6-trichlorobenzoic acid is used and other isomers of the acid are present, all of the isomers will normally be isomers of the same salt regardless of whether or not the mixed isomers are the certain mixtures, as formation of the salt usually requires conversion of the acid and all of the isomers will be converted at the same time.

The 2,3,6-trichlorobenzoic acid or its salts may be formulated in any suitable manner for application to the soil and preferably, but not necessarily, are formulated with a liquid vehicle (carrier) and in such a manner as to form a solution or emulsion. When 2,3,6-trichlorobenzoic acid is used, or a salt that is not sufficiently soluble in water to form an aqueous solution of the desired concentration, then the material is preferably dissolved in a water immiscible solvent, for example, a hydrocarbon solvent such as, xylene, fuel oil or kerosene, preferably containing a wetting or emulsifying agent. The wetting or emulsifying agent aids in dispersing the solution in water to form a relatively stable oil in water type emulsion or dispersion for spraying the area. For example, ethylene oxide fatty acid and fatty acid amine-ethylene oxide condensation products may be used as the wetting agent. However, the herbicide can be dissolved in a water miscible solvent particularly where water is not used for subsequent dilution. The particular solvent used is influenced by the solubility characteristics of the herbicide. In order to reduce the cost of handling and shipping to the user, the concentration of herbicide in liquid as supplied to the user should be relatively high. This concentrate can be dispersed in water or further diluted by the user to form an emulsion, dispersion or solution having the desired concentration for application to the corn field.

Where a salt of 2,3,6-trichlorobenzoic acid is proposed that is sufficiently water soluble, such as an alkali metal, alkaline earth metal, ammonium or water soluble amine salt, the herbicide can of course, be dissolved in water instead of forming an emulsion or dispersion. An aqueous solution can be handled more readily by the ultimate user, the farmer, than can an emulsion or dispersion.

The salts of 2,3,6-trichlorobenzoic acid may be formed in any suitable manner. For example, the metal salts can be readily produced by heating a mixture of 2,3,6-trichlorobenzoic acid, water and a salt former such as metal hydroxide or metal carbonate. The hydroxide or carbonate need not be substantially soluble in the water and metal salts may be formed in this manner regardless of whether or not the salt former is usually considered soluble in water. The amine salts may be produced by heating a mixture of the amine and acid. Water also may be present. It is believed that the amine salts are additive salts and are produced as indicated by the following reaction with triethanolamine, although it is not my intention to be limited to any particular theory as to how the reaction proceeds:

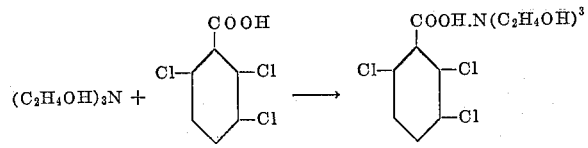

The ammonium salt can be readily formed by neutralizing an aqueous mixture of 2,3,6-trichlorobenzoic acid with ammonium hydroxide. The resulting aqueous solution of the ammonium salt of trichlorobenzoic acid can be used as a herbicide.

The solubilities of some of the salts of the mixed isomers of trichlorobenzoic acid in water are listed below. These solubilities were determined by adding an excess of the salt to 100 grams of distilled water and measuring the amount of salt in solution after 24 hours at 25° C. In the following listing, the solubility is expressed as the percentage by weight of salt in a saturated solution:

| Salt— | Solubility, percent |
|---|---|
| Calcium salt | 9.82 |
| Barium salt | 12.8 |
| Magnesium salt | 23.7 |
| Tert-butylamine salt | 3.85 |
| Tert-octylamine salt | 1.58 |

Any suitable equipment for applying the herbicide of the present invention to the area may be employed, the usual spraying apparatus being preferred. Such apparatus may operate at various pressures, possess nozzles with various orifice size and otherwise differ in character from simple low gallonage (10–20 gallons per acre) to special high gallonage apparatus (100–300 gallons per acre), the concentration of herbicide in the solution, dispersion or emulsion so sprayed being adjusted, of course, by the user to supply to the area the proper quantity of herbicide per acre, or other unit of area, as set forth hereinbefore. In this connection, the farmer may prefer to apply herbicide to the corn rows only, particularly if cultivation preceded the herbicidal treatment. If this procedure is followed, the dosage would be based on the area sprayed. When the corn is quite high the spray nozzles may be set below the top of the corn.

While I prefer the spraying of dispersions or solutions in the manner explained above in order to apply the trichlorobenzoic acid products of the present invention to the area, such products may be formulated as wettable powders or used with solid carriers and dusted on the area to be treated if desired, suitable dusting equipment being employed, of course. For instance, the trichlorobenzoic acid product of the present invention may be admixed with a solid carrier, for example, diatomaceous earth, fuller's earth, bentonite or clay and formulated with a wetting agent or with a suspending agent or both; or it may be admixed with or adsorbed upon particles of a carrier such as vermiculite, an ion exchange material including ion exchange organic resins and ion exchange inorganic clays. If the material is adsorbed upon the carrier, it is preferable to use a carrier having a relatively large particle size such as particles attained from utilizing a 40–50 mesh screen. It is recognized that some authorities advance the theory that when a compound is adsorbed on an ion exchange material a new compound is formed. It also is recognized that when the present herbicides are mixed with the aforesaid solid carriers a complex salt may be formed. However, for present purposes, these solid carriers will be considered inert and the herbicide is the acid or salts mixed therewith.

The following examples illustrate the present invention although it is not limited to the particular conditions set forth except as expressly stated. Unless stated otherwise, and in each example involving plots, the herbicides mentioned were applied to plots separated by or adjacent to plots to which no herbicide was applied for comparative purposes. The herbicidal trichlorobenzoic acid used was a mixture of isomers having the following composition, not varying from batch to batch by more than ±2% for the main constituents, 2,3,6-trichlorobenzoic acid, 2,4,5-trichlorobenzoic acid:

| | Percent |
|---|---|
| 2,3,4-trichlorobenzoic acid | 7.00 |
| 2,3,5-trichlorobenzoic acid | 1.00 |
| 2,3,6-trichlorobenzoic acid | 69.00 |
| 2,4,5-trichlorobenzoic acid | 22.00 |
| 2,4,6-trichlorobenzoic acid | 1.00 |

The trichlorosodium benzoate used was prepared from the same mixed isomers.

Where the relatively insoluble acid form was used, the acid was dissolved in xylene containing a wetting agent at a concentration of about 1.5 lbs. per gallon and this solution was then dispersed in water at such a concentration as to give the desired dosage per unit of area, considering the particular spray equipment used. The sodium salts of these mixed isomers were dissolved in water at a concentration of 1.65 lbs. of trichlorosodium benzoate (1.15 lbs. equivalent weight of trichlorobenzoic acid) per gallon and this solution was in turn diluted with water prior to application to provide the desired concentration.

EXAMPLE I

In this field, the corn (New Jersey No. 7 field corn) was planted with the aid of a planter in rows 36 inches apart and was fertilized in one operation. The herbicide was applied four days after planting and before emergence of the corn or weeds. The ground was medium heavy loam and was moist at the time of planting. The area between the rows as well as along the rows was sprayed and there was no cultivation at any time.

In the following table under "Weed Control" and also under "Injury Data" (I), relative values from 0 to 10 have been used, with "0" indicating no observable effect and "10" indicating the greatest effect. "Size" (S) under "Effect on Corn" indicates the height of the corn with the higher numbers indicating the smallest size. The results were observed at the stated number of days after planting.

*Weed Control*

| Dosage, lbs./acre | 34 Days | | | | 69 Days | | | | 80 Days | | | |
|---|---|---|---|---|---|---|---|---|---|---|---|---|
| | A | B | C | D | A | B | C | D | A | B | C | D |
| 0.25 | 2 | 2 | 2 | 0 | 3 | 1 | 1 | 0 | 2 | 3 | 1 | 1 |
| 0.5 | 6 | 6 | 4 | 4 | 6 | 6 | 1 | 1 | 7 | 7 | 1 | 1 |
| 0.75 | 6 | 6 | 4 | 4 | 5 | 6 | 2 | 1 | 7 | 8 | 3 | 3 |
| 1.0 | 8 | 8 | 6 | 6 | 7 | 7 | 2 | 3 | 8 | 8 | 3 | 3 |
| 1.5 | 10 | 10 | 6 | 6 | 9 | 9 | 2 | 2 | 9 | 9 | 3 | 1 |

*Effect on Corn*

| Dosage, lbs./acre | 34 Days—Injury Data | | | | 80 Days—Injury "I" and Size "S" Data | | | | | | | |
|---|---|---|---|---|---|---|---|---|---|---|---|---|
| | A | B | C | D | A | | B | | C | | D | |
| | | | | | I | S | I | S | I | S | I | S |
| 0.25 | 0 | 0 | 0 | 0 | 0 | 5 | 0 | 1 | 0 | 2 | 0 | 8 |
| 0.5 | 0 | 0 | 0 | 0 | 0 | 1 | 0 | 0 | 0 | 4 | 0 | 5 |
| 0.75 | 0 | 0 | 0 | 0 | 0 | 1 | 0 | 0 | 0 | 1 | 0 | 2 |
| 1.0 | 0 | 1 | 0 | 0 | 0 | 0 | 0 | 0 | 0 | 3 | 0 | 1 |
| 1.5 | 1 | 1 | 1 | 0 | 0 | 0 | 0 | 0 | 0 | 1 | 0 | 5 |

A=sodium salt of trichlorobenzoic acid mixed isomers.
B=trichlorobenzoic acid mixed isomers.
C=triethanolamine salts of 2,4-dichlorophenoxyacetic acid.
D=butoxyethanol ester of 2,4-dichlorophenoxyacetic acid.

The dosages of A, C and D are set forth as the weight of acid equivalent to the weight of material actually applied. The actual weight applied of either A, C or D was the weight obtained by multiplying the dosage weight set forth above by the following fraction:

$$\frac{\text{molecular weight of A, C or D}}{\text{molecular weight of the corresponding acid}}$$

As to the control of the weeds, both the acid and salts of trichlorobenzoic acid used in these experiments gave good control at 0.5 and 0.75 lb./acre and excellent control at 1.0 and 1.5 lbs./acre. The good to excellent weed control by both forms persisted for 80 days with no cultivation, whereas the herbicidal effectiveness of the 2,4-dichlorophenoxyacetic acid compounds was markedly reduced after 34 days. The herbicidal trichlorobenzoic acid gave considerably better control of annual weeds than did the 2,4-dichlorophenoxyacetic acid compounds.

As to the effect on the corn, there were slight epanastic effects observed at 34 days as indicated, but even with the highest dosages there were no deleterious effects revealed at the end of the 80 days' period. The most vigorous corn was in those areas treated with either the soluble sodium form or acid form of trichlorobenzoic acid. The ear development was appreciably further advanced in those areas treated with the two forms of herbicidal trichlorobenzoic acid, particularly the areas treated with the higher dosages.

Areas not treated with herbicides were choked with weeds; and the corn in such areas was greatly stunted and there was no appreciable development of the ears. In the areas treated, the corn appeared to be suppressed in accordance with the weed population and, as a result, grew taller in the areas in which weed control was effective.

Additional areas were treated with the same dosages of a mixture of sodium salt of trichlorobenzoic acid and triethanolamine salt of 2,4-dichlorophenoxyacetic acid and a mixture of trichlorobenzoic acid and butoxyethanol ester of 2,4-dichlorophenoxyacetic acid, such mixtures being equal parts by weight of their respective compounds. While these mixtures produced better results than the 2,4-dichlorophenoxyacetic acid compounds alone, from the standpoint of weed control and effect on corn the results were not as outstanding as those obtained with the herbicidal trichlorobenzoic acid or its sodium salt.

EXAMPLE II

In this field, sweet corn (New Jersey No. 106) was planted and the soil was sprayed three days after planting. The field was observed at 27 days and 62 days after planting. The results are set forth in the following table:

| Dosage, lbs./acre | 27 Days | | | | 62 Days | | | |
|---|---|---|---|---|---|---|---|---|
| | A | B | C | D | A | B | C | D |
| 0.5 | 6 | --- | 4 | --- | 6 | 7 | 3 | 3 |
| 1.0 | 8 | 8 | 6 | 6 | 5 | 7 | 5 | 3 |
| 1.5 | 8 | 8 | 6 | 8 | 8 | 8 | 4 | 6 |

The A, B, C and D herbicides were the same as in Example I.

Both forms of 2,3,6-trichlorobenzoic acid (A and B) gave better control of annual weeds than the 2,4-dichlorophenoxyacetic acid compounds (C and D). There was no damage to the corn. Where no herbicide was used, the corn was overrun with weeds.

EXAMPLE III

In this field, each of the test crop species was planted in four adjacent rows with all rows extending parallel. On the day after planting, spaced strips extending across the rows were sprayed with the sodium salt of the mixed isomers of trichlorobenzoic acid in dosages of 3 and 6 pounds per acre. The test crops planted were: lima beans, cucumbers, flax, ladino clover, sugar beets, sorghum, snapbeans, cotton, alfalfa, soybeans, field corn, peanut, buckwheat, squash, sudan grass, lespedeza, wheat, cantaloupes, oats, peas, and kenafe. The results were observed forty days after planting. The herbicide prevented growth of virtually all of the weeds and the crops as well, except for the field corn and sorghum which survived with little evident effect. I regard the 3 pounds per acre dosage as the practical maximum for my process, and higher than is needed or advisable for most conditions. The dosage of 6 pounds per acre is too high for normal use, and the fact that in the example it caused no serious damage to the corn and sorghum may have been a result of the circumstance that only about 2 inches of rainfall occurred and came about 30 days after planting.

EXAMPLE IV

In this field, the sweet corn was planted in rows and part of the rows were not sprayed with any herbicide. All of the remaining rows were sprayed at the rate of 1.0 pound/acre with the mixed isomers of trichlorobenzoic acid. Where a herbicide was used, separate portions of the rows were sprayed at 2, 5, 10, 13 and 17 days after planting. The field was observed 22 days after planting at which time only the nontreated rows had been cultivated. Weather and soil conditions were such that the corn started to emerge at 4–5 days after planting. In the non-sprayed rows, the weeds not killed by cultivation were about as tall as the corn. In the rows sprayed 2 days and 5 days after planting there was excellent control of the weeds (both dicots and annual monocot grasses) and particularly no weeds were present. The few scattered weeds present were very small and they showed strong epinastic damage. In the rows sprayed 13 and 17 days after the planting, there was poor control of the weeds. There were a large number of weeds present and while not as large in size as the weeds in the cultivated rows, the weeds were well established and the weed control was not satisfactory. In the rows sprayed 10 days after planting the results were between those obtained at 5 days and 13 days and while there was fairly good control of dicots, the annual grasses were not well controlled. However, subsequent observations at later periods showed good control of the weeds in the rows sprayed at 10, 13 and 17 days after planting.

EXAMPLE V

This experiment is a comparative test and shows that herbicidal trichlorobenzoic acid has a much larger residual effect in soil than "2–4–D." The soil in a series of flats was sprayed either with substantially pure 2,3,6-trichlorobenzoic acid or "2–4–D" acid at a dosage of 3 lbs. per acre. All flats were watered periodically after spraying with herbicides. Portions of each series of flats were planted on the same day the herbicide was applied and other portions were planted at 1 week and 2 weeks after spraying. Seeds of simulated broad leaf-weeds were used. The 2,3,6-trichlorobenzoic acid had less effect on the weeds in the flats planted 1 and 2 weeks after spraying than in the flats planted the same day. However, there was definitely some effect in the flats planted after 1 and 2 weeks. With the "2–4–D" the effects in the flats planted after 1 week were slight, and in those flats planted after 2 weeks the effect was even less. This illustrates the advantage of my process in permitting a longer interval between the soil treatment and planting.

EXAMPLE VI

In this series of comparative tests, groups of flats containing soil were planted with rape, lambsquarters, timothy and golden millet seed, respectively. In each group of flats, a series of dilute solutions of various salts of trichlorobenzoic acid in water were applied at dosages equivalent to 1 and 2 pounds of acid per acre. For comparative purposes, flats in each group were treated with the triethanolamine salt of "2–4–D" at dosages equivalent to 1 and 2 pounds per acre of the acid. Flats not treated with herbicide were used as controls. Each flat contained seeds of only one kind and was treated with only one herbicide at one dosage. When herbicide was applied it was applied the same day the flat was planted. In all cases except one, the salts of trichlorobenzoic acid were salts of the mixed isomers. In the case of the tert-butylamine salt, a salt of substantially pure 2,3,6-trichlorobenzoic acid was tested along with a salt of the mixed isomers and these salts are distinguished in the following table by the terms "2,3,6-isomer" and "mixed isomers," respectively.

In the following table, the results are set forth as observed 12 days after planting. In this table, the letters "D," "S," and "I" refer to density of the plants, size of the plants and injury to the plants, respectively. The effectiveness of the herbicides, as determined by comparison with the controls, is indicated by the numerals "0" through "5" in increasing order of effectiveness. Thus,

| Herbicide | Rape | | | | | | Lamb's-quarters | | | | | | Timothy | | | | | | Golden Millet | | | | | |
|---|---|---|---|---|---|---|---|---|---|---|---|---|---|---|---|---|---|---|---|---|---|---|---|---|
| | 1 lb./acre | | | 2 lbs./acre | | | 1 lb./acre | | | 2 lbs./acre | | | 1 lb./acre | | | 2 lbs./acre | | | 1 lb./acre | | | 2 lbs./acre | | |
| | D | S | I | D | S | I | D | S | I | D | S | I | D | S | I | D | S | I | D | S | I | D | S | I |
| Magnesium Salt | 3 | 2 | 3 | 4 | 3 | 3 | 2 | 3 | 3 | 3 | 4 | 4 | 3 | 3 | 3 | 4 | 3 | 3 | 2 | 4 | 3 | 2 | 4 | 4 |
| Calcium Salt | 3 | 3 | 3 | 4 | 3 | 3 | 2 | 3 | 3 | 4 | 4 | 4 | 3 | 3 | 3 | 4 | 3 | 3 | 2 | 3 | 3 | 3 | 4 | 4 |
| Barium Salt | 4 | 2 | 3 | 4 | 4 | 4 | 2 | 3 | 3 | 3 | 4 | 4 | 3 | 4 | 3 | 4 | 4 | 4 | 2 | 4 | 3 | 4 | 4 | 4 |
| t-Butylamine Salt (2,3,6-isomer) | 3 | 3 | 3 | 4 | 3 | 3 | 2 | 3 | 3 | 3 | 4 | 4 | 3 | 4 | 3 | 4 | 3 | 4 | 2 | 4 | 3 | 4 | 4 | 4 |
| t-Butylamine Salt (mixed isomers) | 2 | 3 | 3 | 4 | 4 | 4 | 2 | 3 | 3 | 3 | 4 | 4 | 4 | 3 | 3 | 4 | 4 | 4 | 3 | 3 | 3 | 3 | 3 | 3 |
| t-Octylamine Salt | 3 | 3 | 3 | 4 | 3 | 3 | 3 | 3 | 3 | 3 | 4 | 4 | 4 | 3 | 3 | 4 | 4 | 4 | 2 | 3 | 3 | 3 | 4 | 4 |
| Potassium Salt | 2 | 3 | 3 | 4 | 4 | 1 | 3 | 3 | 3 | 3 | 4 | 4 | 4 | 3 | 3 | 4 | 3 | 3 | 2 | 3 | 3 | 4 | 4 | 4 |
| Lithium Salt | 3 | 3 | 3 | 4 | 3 | 3 | 3 | 3 | 3 | 3 | 4 | 4 | 3 | 3 | 3 | 4 | 3 | 3 | 2 | 4 | 3 | 3 | 4 | 4 |
| Manganese Salt | 4 | 3 | 3 | 4 | 4 | 4 | 2 | 3 | 3 | 3 | 4 | 4 | 3 | 3 | 3 | 4 | 4 | 4 | 1 | 3 | 3 | 3 | 4 | 3 |
| Aluminum Salt (basic) | 1 | 2 | 2 | 3 | 3 | 3 | 1 | 2 | 2 | 2 | 3 | 2 | 4 | 3 | 3 | 4 | 3 | 4 | 0 | 3 | 2 | 2 | 3 | 2 |
| Iron Salt (basic) | 0 | 2 | 2 | 2 | 3 | 3 | 1 | 2 | 2 | 2 | 3 | 2 | 4 | 3 | 3 | 4 | 3 | 4 | 2 | 4 | 3 | 4 | 3 | 3 |
| Zinc Salt (basic) | 2 | 3 | 3 | 4 | 3 | 3 | 2 | 2 | 2 | 4 | 4 | 4 | 4 | 3 | 3 | 4 | 3 | 4 | 1 | 3 | 3 | 4 | 3 | 3 |
| Sodium Salt | 3 | 3 | 3 | 4 | 4 | 4 | 3 | 3 | 3 | 4 | 4 | 4 | 4 | 4 | 1 | 4 | 3 | 1 | 4 | 3 | 0 | 5 | 4 | 1 |
| 2-4-D | 4 | 4 | 4 | 4 | 5 | 5 | 0 | 3 | 0 | 2 | 3 | 1 | 4 | 4 | 1 | 4 | 3 | 1 | 4 | 3 | 0 | 5 | 4 | 1 |

"0" indicates no herbicidal effect while "5" indicates extreme effectiveness.

EXAMPLE VII

In this field test, an area was planted with New Jersey No. 106 Sweet Corn in rows. Twenty-seven days after planting and when the growing corn and weeds were fairly high, certain rows were treated as hereinafter described. In one part of this area the rows were divided into three groups and the rows of one group were treated with the sodium salt of mixed isomers of trichlorobenzoic acid containing about 70% 2,3,6-isomer, 22% 2,4,5-isomer and 8% other isomers. The amount of sodium salt applied per acre was equivalent to 0.35 pound per acre of 2,3,6-trichlorobenzoic acid or 0.5 pound per acre of trichlorobenzoic acid. The second group of rows were treated with the triethanolamine salt of 2,4-dichlorophenoxyacetic acid in an amount equivalent to 0.5 pound per acre of 2,4-dichlorophenoxyacetic acid. The third group of rows were not treated and were used as control rows.

In the other part of the area, the rows also were divided into three groups and one group was treated with a herbicidal composition containing the sodium salt of the same mixed isomers of trichlorobenzoic acid. The amount of herbicidal composition applied was equivalent to 0.7 pound per acre of 2,3,6-trichlorobenzoic acid or 1.0 pound per acre of the mixed isomer of trichlorobenzoic acid. The second group of rows was treated with a herbicidal composition containing the triethanolamine salt of 2,4- dichlorophenoxyacetic acid. The amount of triethanolamine salt applied was equivalent to 1.0 pound per acre of 2,4-dichlorophenoxyacetic acid. The third or control group of corn rows was not treated. The herbicidal compositions were applied over the entire area treated including the corn, the weeds and the soil by spraying.

The area was observed 16 days after treatment and the results are set forth in Table I. The effectiveness of the herbicide was determined by comparison with the control rows to which an effectiveness of "0" was assigned. Effectiveness on the weeds is expressed with the numerals 1–10 in the order of increasing effectiveness. There was no observable damage to the corn. The effectiveness of weed control in the rows treated with the equivalent of 0.35 pound per acre of 2,3,6-trichlorobenzoic acid was 6. The treatment with the equivalent of 0.5 pound per acre of 2,4-dichlorophenoxyacetic acid produced the same result.

In the other part of the field area, the higher dosage of the sodium salt produced an effectiveness value on the weeds of 6 while the higher dosage of the triethanolamine salt of 2,4-dichlorophenoxyacetic acid produced an effectiveness of 7. For comparison, the results observed at 16 days are set forth in the following table with the dosages representing the equivalent amount of acid.

| Dosage, lbs./acre | Effect on Weeds | |
|---|---|---|
| | Sodium salt of 2,3,6-trichlorobenzoic acid | Triethanolamine Salt of 2,4-dichlorophenoxyacetic acid |
| 0.35 | 6 | |
| 0.7 | 6 | |
| 0.5 | | 6 |
| 1.0 | | 7 |

The corn was harvested from the area 77 days after spraying. The ears were counted and weighed and effectiveness of weed control noted. The results are set forth in the following table:

| First Part of Area | No. of Ears | Weight of Ears in lbs. | Weed Control |
|---|---|---|---|
| 0.35 lb./acre of A | 126 | 72.5 | 6 |
| 0.5 lb./acre of B | 111 | 62 | 7 |
| None—Controls—Second Part of Area | 90 | 51.2 | 0 |
| 0.7 lb./acre of A | 109 | 55.2 | 6 |
| 1.0 lb./acre of B | 118 | 66 | 8 |
| None—Controls | 58 | 26.7 | 0 |

A represents the sodium salt of 2,3,6-trichlorobenzoic acid.
B represents the triethanolamine salt of 2,4-dichlorophenoxyacetic acid.

The control rows were not cultivated and the weed growth was very heavy, particularly in the control rows of the second portion of the area.

EXAMPLE VIII

In this field U.S. No. 13 field corn was planted in rows during June and 12 days later different areas containing established growing corn were treated with various herbicides. The previously described mixed isomers of trichlorobenzoic acid in the acid form and sodium salt form were used as was the triethanolamine salt of 2,4-dichlorophenoxy-acetic acid. The dosages refer to the amount of acid or the equivalent amount of acid. For comparative purposes the dosages of the 2,3,6-isomer is accompanied in parenthesis by the dosage of the mixed isomers. The following table set forth the results as observed 38 days after spraying with the herbicide. The numerals 0–10 indicate increasing effectiveness with "0" representing no control and "10" representing complete control (substantially no weeds) of the weeds as determined by comparison with rows of corn not treated with herbicide.

| Dosage, lb./acre | Herbicide | |
|---|---|---|
| | 2,3,6-trichlorobenzoic Acid | Sodium salt of 2,3,6-trichlorobenzoic Acid |
| 0.175 (0.25) | 1 | 1 |
| 0.35 (0.5) | 1 | 1 |
| 0.525 (0.75) | 8 | 7 |
| 0.7 (1.0) | 8 | 9 |
| | Triethanolamine salt of 2,4-dichlorophenoxyacetic acid | |
| 0.25 | 1 | |
| 0.5 | 1 | |
| 0.75 | 7 | |
| 1.0 | 9 | |

The effectiveness of the two 2,3,6-trichlorobenzoic acid compounds was substantially the same as for the 2,4-dichlorophenoxyacetic acid compound. There was no damage to the corn. The corn was harvested 113 days after herbicidal treatment. The ears were counted and weighed in the husks with the tiny ears or culls being discarded in each case. The control rows produced 70 ears weighing 21.2 pounds and the weed control was considered as 0. The yield in the treated rows is set forth in the following table along with the effectiveness of the weed control at the time of harvest.

| Dosage, lb./acre | Wt. of Ears | No. of Ears | Weed Control |
|---|---|---|---|
| 2,3,6-Trichlorobenzoic Acid | | | |
| 0.175 | 33.5 | 90 | 1 |
| 0.35 | 40.4 | 96 | 1 |
| 0.525 | 56.2 | 94 | 8 |
| 0.7 | 56.2 | 122 | 8 |
| Sodium Salt of 2,3,6-Trichlorobenzoic Acid | | | |
| 0.175 | 20 | 69 | 1 |
| 0.35 | 41 | 99 | 1 |
| 0.525 | 45.5 | 99 | 7 |
| 0.7 | 62.7 | 115 | 9 |
| Triethanolamine Salt of 2,4-Dichlorophenoxyacetic Acid | | | |
| 0.25 | 30.2 | 86 | 1 |
| 0.5 | 40.2 | 103 | 1 |
| 0.75 | 55.2 | 127 | 7 |
| 1.0 | 58.2 | 108 | 9 |

EXAMPLE IX

In this field test New Jersey No. 7 field corn was planted in rows. Various groups of rows were separately treated with different herbicides in a variety of dosages. Both 2,3,6-trichlorobenzoic acid and the sodium salt of this acid were used with the acid in each instance comprising the previously described mixture of isomers. For comparative purposes other rows of corn were treated with the triethanolamine salt of 2,4-dichlorophenoxyacetic acid. All of the herbicides were applied by spraying 27 days after planting. The dosages hereinafter referred to refer to the amount of 2,3,6-trichlorobenzoic acid actually applied or the amount of 2,3,6-trichlorobenzoic acid equivalent to the amount of sodium salt of this acid actually applied. The dosage amounts referred to in connection with the amine salt of 2,4-dichlorophenoxyacetic acid and the amounts of this acid equivalent to amount of triethanolamine salt actually applied.

The field was observed at 11 days and again 57 days after spraying. When observed at 57 days the two highest dosages of the 2,3,6-trichlorobenzoic acid as well as the two highest dosages of the amine salt of 2,4-dichlorophenoxyacetic acid appeared to have caused some slight damage to the corn as indicated by some abnormal brace root development and some rigidity of terminal portions of the corn. The control of the weeds is set forth in the following table with 0 to 10 indicating increasing effectiveness as determined by comparison with control rows which were not treated with a herbicide.

| Dosage, lbs./acre | Period in Days After Spraying | |
|---|---|---|
| | 11 | 57 |
| 2,3,6-Trichlorobenzoic Acid | | |
| 0.175 | 1 | 2 |
| 0.35 | 2 | 7 |
| 0.525 | 3 | 7 |
| 0.7 | 3 | 7 |
| 1.05 | 4 | 9 |
| Sodium Salt of 2,3,6-Trichlorobenzoic Acid | | |
| 0.175 | 2 | 3 |
| 0.35 | 2 | 6 |
| 0.525 | 3 | 7 |
| 0.7 | 3 | 8 |
| 1.05 | 4 | 8 |
| Triethanolamine Salt of 2,4-Dichlorophenoxyacetic Acid | | |
| 0.25 | 1 | 3 |
| 0.5 | 2 | 6 |
| 0.75 | 3 | 7 |
| 1.0 | 3 | 9 |
| 1.5 | 4 | 9 |

In the rows where the lowest dosage of each of the herbicides was used, there was some damage to the corn as a result of the poorer weed control and smothering of the corn by the weeds. However, these low dosages did reduce the weed growth.

EXAMPLE X

In this field test, Carmel Cross and Ohio Chief sweet corn were planted in rows in separate but adjacent areas. Part of the rows in each area were sprayed with the sodium salt of the previously described mixed isomers of trichlorobenzoic acid. The quantity of herbicide applied contained an amount of sodium salt equivalent to 0.7 pound per acre of 2,3,6-trichlorobenzoic acid. Part of the treated rows in each area were sprayed 13 days after planting and part of the treated rows were sprayed 17 days after planting. In both cases the weeds and corn were well established at the time of planting. Control, non-sprayed, rows in each area were cultivated three times which was the normal cultivation treatment for this area in the country. In the treated rows, the first cultivation was omitted and the rows were cultivated only twice.

The area was observed at 27 days, 46 days and 60 days after planting. At the two first observations there was some slight stunting of the corn and some leaf roll. However, when observed 60 days after planting there was no noticeable stunting or any other undesirable effect on the corn. The effect on the weeds in these rows is set forth in the following table as determined by comparison with non-treated and non-cultivated plots in each area.

| Days Sprayed After Planting | Carmel Cross Sweet Corn | | |
|---|---|---|---|
| | Weed Control | | |
| | 27 days | 46 days | 60 days |
| 13 | 5 | 8 | 7 |
| 17 | 3 | 6 | 7 |
| Control rows | | 7 | 7 |
| | Ohio Chief Sweet Corn | | |
| 13 | 2 | 7 | 6 |
| 17 | 1 | 7 | 6 |
| Control rows | | 6 | 6 |

NOTE.—Weed control values: 0 to 10 indicate increasing effectiveness

The soil was a light sandy loam and the herbicide apparently caused a very slight stunting of the ears at harvest time indicating that for this type of soil and for these types of sweet corn the maximum dosage should be somewhat less than 0.7 lb./acre and about 0.6 lb./acre. However, with somewhat heavier soils the dosage could be increased. The dosages also could be increased if field corn were planted in this type of soil.

I claim:
1. In the culture of a corn crop in an area, the method of inhibiting weed growth in such area comprising applying to the area a herbicide composition containing a herbicidal material selected from the group consisting of 2,3,6-trichlorobenzoic acid, salts of 2,3,6-trichlorobenzoic acid, and mixtures thereof, the amount of herbicidal composition so applied per acre containing an amount of such herbicidal material equivalent to 0.15 to 3 pounds of 2,3,6-trichlorobenzoic acid.

2. In the culture of a corn crop in an area, the method of inhibiting weed growth in such area comprising applying to the area a herbicidal composition containing a herbicidal material selected from the group consisting of 2,3,6-trichlorobenzoic acid, salts of 2,3,6-trichlorobenzoic acid, and mixtures thereof, the amount of herbicidal composition so applied per acre containing an amount of such herbicidal material equivalent to 0.35 to 2 pounds of 2,3,6-trichlorobenzoic acid.

3. In the culture of a corn crop in an area, the method of inhibiting weed growth in such area comprising applying to the area a herbicidal composition containing 2,3,6-trichlorobenzoic acid, the amount of herbicidal composition applied per acre containing 0.15 to 3 pounds of 2,3,6-trichlorobenzoic acid.

4. In the culture of a corn crop in an area, the method of inhibiting weed growth in such area comprising applying to the area a herbicidal composition containing a salt of 2,3,6-trichlorobenzoic acid, the amount of herbicidal composition applied per acre containing an amount of said salt equivalent to 0.15 to 3 pounds of 2,3,6-trichlorobenzoic acid.

5. In the culture of a corn crop in an area, the method of inhibiting weed growth in such area comprising applying to the area a herbicidal composition containing the sodium salt of 2,3,6-trichlorobenzoic acid, the amount of herbicidal composition applied per acre containing an amount of said sodium salt equivalent to 0.15 to 3 pounds of 2,3,6-trichlorobenzoic acid.

6. In the culture of a corn crop in an area, the method of inhibiting weed growth in such area comprising applying to the area a herbicidal composition containing the ammonium salt of 2,3,6-trichlorobenzoic acid, the amount of herbicidal composition applied per acre containing an amount of said ammonium salt equivalent to 0.15 to 3 pounds of 2,3,6-trichlorobenzoic acid.

7. In the culture of a corn crop in an area, the method of inhibiting weed growth in such area comprising applying to the area a herbicidal composition containing the calcium salt of 2,3,6-trichlorobenzoic acid, the amount of herbicidal composition applied per acre containing an amount of said calcium salt equivalent to 0.15 to 3 pounds of 2,3,6-trichlorobenzoic acid.

8. In the culture of a corn crop in an area, the method of inhibiting weed growth in such area comprising applying to the area a herbicidal composition containing an amine salt of 2,3,6-trichlorobenzoic acid, the amount of herbicidal composition applied per acre containing an amount of said amine salt equivalent to 0.15 to 3 pounds of 2,3,6-trichlorobenzoic acid.

9. In the culture of a corn crop in an area, the method of inhibiting weed growth in such area comprising applying to the area a herbicidal composition containing the triethanolamine salt of 2,3,6-trichlorobenzoic acid, the amount of herbicidal composition applied per acre containing an amount of said triethanolamine salt equivalent to 0.15 to 3 pounds of 2,3,6-trichlorobenzoic acid.

10. In the culture of a corn crop in an area, the method of inhibiting weed growth in such area comprising applying to the area while containing an established growing corn crop, a herbicidal composition containing a herbicidal material selected from the group consisting of 2,3,6-trichlorobenzoic acid, salts of 2,3,6-trichlorobenzoic acid, and mixtures thereof, the amount of herbicidal composition so applied per acre containing an amount of such herbicidal material equivalent to 0.15 to 2 pounds of 2,3,6-trichlorobenzoic acid.

11. In the culture of Zea mays in an area, the method of inhibiting weed growth in such an area comprising applying to the area while containing an established growing Zea mays crop, a herbicidal composition containing a herbicidal material selected from the group consisting of 2,3,6-trichlorobenzoic acid, the salts of 2,3,6-trichlorobenzoic acid, and mixtures thereof, the amount of herbicidal composition so applied per acre containing an amount of such herbicidal material equivalent to 0.25 to 1.5 pounds of 2,3,6-trichlorobenzoic acid.

12. In the culture of field corn in an area, the method of inhibiting weed growth in such an area comprising applying to the area while containing an established growing field corn crop, a herbicidal composition containing a herbicidal material selected from the group consisting of 2,3,6-trichlorobenzoic acid, the salts of 2,3,6-trichlorobenzoic acid, and mixtures thereof, the amount of herbicidal composition so applied per acre containing an amount of such herbicidal material equivalent to 0.25 to 1.5 pounds of 2,3,6-trichlorobenzoic acid.

13. In the culture of sweet corn in an area, the method of inhibiting weed growth in such an area comprising applying to the area while containing an established growing sweet corn crop, a herbicidal composition containing a herbicidal material selected from the group consisting of 2,3,6-trichlorobenzoic acid, the salts of 2,3,6-trichlorobenzoic acid, and mixtures thereof, the amount of herbicidal composition so applied per acre containing an amount of such herbicidal material equivalent to 0.25 to 1.25 pounds of 2,3,6-trichlorobenzoic acid.

14. In the culture of a corn crop in soil prepared for planting and normally supporting subsequent weed growth, the method of obtaining prolonged protection of the crop against such weed growth comprising applying to the superficial soil, in an area so prepared and at about the time of planting the crop, a herbicidal composition containing a material selected from the group consisting of 2,3,6-trichlorobenzoic acid, the salts of 2,3,6-trichlorobenzoic acid, and mixtures thereof, the amount of herbicidal composition applied to the soil per acre containing an amount of said material equivalent to from 0.15 to 3 pounds of 2,3,6-trichlorobenzoic acid.

15. In the culture of a corn crop in soil prepared for planting and normally supporting subsequent weed growth, the method of obtaining prolonged protection of the crop against such weed growth comprising applying to the superficial soil, in an area so prepared and at the time of planting the crop, a herbicidal composition containing 2,3,6-trichlorobenzoic acid, the amount of herbicidal composition applied to the soil per acre containing about 0.15 to 3 pounds of 2,3,6-trichlorobenzoic acid.

16. In the culture of a corn crop in soil prepared for planting and normally supporting subsequent weed growth, the method of obtaining prolonged protection of the crop against such weed growth comprising applying to the superficial soil, in an area so prepared and at about the time of planting the crop, a herbicidal composition containing a salt of 2,3,6-trichlorobenzoic acid, the amount of herbicidal composition applied to the soil per acre containing an amount of said salt equivalent to 0.15 to 3 pounds of 2,3,6-trichlorobenzoic acid.

References Cited in the file of this patent

UNITED STATES PATENTS

| | | |
|---|---|---|
| 2,394,916 | Jones | Feb. 12, 1946 |
| 2,695,840 | Leppla | Nov. 30, 1954 |
| 2,724,643 | Morris et al. | Nov. 22, 1955 |
| 2,726,947 | Baumgartner | Dec. 13, 1955 |
| 2,848,470 | Girard et al. | Aug. 19, 1958 |

OTHER REFERENCES

Zimmerman et al., in "Contributions of Boyce Thompson Institute," vol. 16, Jan.–Mar. 1951, pages 209 to 213 inclusive.

Miller in "Weeds," January 1952, pages 185 to 188 inclusive.